(12) United States Patent
Min et al.

(10) Patent No.: US 12,722,285 B2
(45) Date of Patent: Sep. 1, 2026

(54) MANIPULATOR ROBOT

(71) Applicant: HYUNDAI MOBIS CO., LTD., Seoul (KR)

(72) Inventors: Kyong Won Min, Seoul (KR); Hyun Sik Han, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 110 days.

(21) Appl. No.: 18/633,706

(22) Filed: Apr. 12, 2024

(65) Prior Publication Data

US 2025/0001591 A1 Jan. 2, 2025

(30) Foreign Application Priority Data

Jun. 30, 2023 (KR) ........................ 10-2023-0085243
Jul. 24, 2023 (KR) ........................ 10-2023-0095853

(51) Int. Cl.
*B25J 9/10* (2006.01)
*B25J 15/00* (2006.01)

(52) U.S. Cl.
CPC ........... *B25J 9/106* (2013.01); *B25J 15/0019* (2013.01)

(58) Field of Classification Search
CPC ........ B25J 9/106; B25J 15/0019; B25J 9/042; B25J 9/046; B25J 9/102; B25J 9/104
USPC .......................................................... 700/245
See application file for complete search history.

(56) References Cited

U.S. PATENT DOCUMENTS 12,055,193 B2 * 8/2024 Phillips ................. F16F 15/002
2003/0066373 A1 * 4/2003 Maeguchi .............. B25J 9/1065 901/14
2007/0089557 A1 * 4/2007 Solomon ................ A61B 34/71 74/490.01
2019/0000577 A1 * 1/2019 Shelton, IV ........... B25J 9/1689
2020/0354161 A1 * 11/2020 Yoshida ................... B25J 15/10
2023/0134924 A1 * 5/2023 Sun ........................ B25J 9/1697 700/259
2024/0058960 A1 * 2/2024 Verma ...................... B25J 5/007

* cited by examiner

*Primary Examiner* — Kira Nguyen
(74) *Attorney, Agent, or Firm* — NSIP Law

(57) ABSTRACT

A manipulator robot is provided. The manipulator robot includes a first link. a second link including an end effector at one side thereof, the first link pivotably connected to another side of the second link, a single motor to provide a pivoting force for pivoting the first link and the second link, and a pivoting force transmitting member to transmit a pivoting force of one of the first link and the second link by the single motor to pivot the other.

17 Claims, 14 Drawing Sheets

MANIPULATOR ROBOT

CROSS-REFERENCE TO RELATED APPLICATION(S)

This application claims the benefit under 35 USC § 119 of Korean Patent Application Nos. 10-2023-0085243, and 10-2023-0095853, respectively filed on Jun. 30, 2023 and Jul. 24, 2023, in the Korean Intellectual Property Office, the entire disclosures of which are hereby incorporated by reference for all purposes.

BACKGROUND

1. Field

A following description relates to a manipulator robot, and specifically, to a manipulator robot that simplifies a robot composed of two links, using one driver.

2. Description of the Related Art

A robot technology may be broadly divided into a mobile robot and a manipulator robot that may perform tasks by having an end effector at an end thereof that performs a function of a robot arm.

In a case of the manipulator robot, there is a manipulator robot that may move with 2 degrees of freedom within a plane and may move vertically at the end effector.

FIG. 1 is a diagram for illustrating an existing 2-degree-of-freedom manipulator robot.

As shown in FIG. 1, the existing 2-degree-of-freedom manipulator robot may have an arm composed of two links L1 and L2 and two motors M1 and M2, and an end effector 110 may be mounted at an end of the second link L2.

Such 2-degree-of-freedom manipulator robot may be utilized in various fields as follows.

1. Palletizing and Depalletizing
2. Pick and Place Operations
3. Vision Inspection
4. Fusion and Cutting
5. Drilling and Tapping However, when the existing manipulator robot as described above requires only a 1-degree-of-freedom movement in the field, the above-mentioned manipulator robot with the 2 degrees of freedom may be seen as over-spec because (i) the 1-degree-of-freedom movement may be theoretically achieved with only one motor, (ii) it is relatively expensive, (iii) it has a complicated structure, and (iv) it is relatively difficult to control the two motors to move linearly.

SUMMARY

To solve the problem described above, one aspect of the present disclosure is to provide a manipulator robot that simplifies a robot composed of two links, using one driver.

In addition, it is to provide a manipulator robot that provides not only a linear movement but also various curvilinear movements by setting lengths of two links of the manipulator robot and an angle between the links.

Problems to be solved in the present disclosure are not limited to the problems mentioned above, and other problems not mentioned will be clearly understood by those skilled in the art to which the present disclosure belongs from a description below.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a manipulator robot includes: a first link; a second link including an end effector at one side thereof, the first link pivotably connected to another side of the second link; a single motor configured to provide a pivoting force for pivoting the first link and the second link; and a pivoting force transmitting member configured to transmit a pivoting force of one of the first link and the second link by the single motor to pivot the other.

The pivoting force transmitting member may include a belt connecting a second connection portion connecting the second link with one side of the first link and a first connection portion connecting another side of the first link.

The first connection portion and the second connection portion may respectively comprise a first pulley and a second pulley.

The single motor may be disposed at one of the first connection portion and the second connection portion.

The manipulator robot may be actuated for a linear movement, lengths of the first link and the second link are set to be the same as each other.

During the linear movement, a first angle between the first link and a direction of linear movement may be controlled to be maintained at ½ of a second angle between an extension line of the first link and the second link.

When the manipulator robot is actuated for a curvilinear movement, lengths of the first link and the second link may be set to be different from each other.

The pivoting force transmitting member may correspond to a gear combination including: a first gear located at a connection portion connecting the second link with one side of the first link and configured to rotate; a second gear located at the other side of the first link and configured to rotate; and a third gear disposed to transmit a rotational force of one of the first gear and the second gear as a rotational force to rotate the other.

The gear combination may be composed of an odd number of gears, including the first to third gears.

The single motor may be disposed at a center of one of the first to third gears.

When the manipulator robot is actuated for a linear movement, lengths of the first link and the second link may be set to be the same as each other.

During the linear movement, a first angle between the first link and a direction of linear movement may be controlled to be maintained at ½ of a second angle between an extension line of the first link and the second link.

The end effector may perform a function of a robot arm.

When the manipulator robot is actuated for a curvilinear movement, lengths of the first link and the second link may be set to be different from each other.

In another general aspect of the disclosure, a manipulator robot includes: a first link; a second link including an end effector at one side thereof, the first link pivotably connected to another side of the second link; a single motor configured to provide a pivoting force; a pivoting force transmitting member that transmits the pivoting force; and a controller configured to: control the single motor to pivot at least one of the first link, the second link, or a combination thereof; and control the pivoting force transmitting member to transmit the pivoting force of one of the first link and the second link provided by the single motor to pivot the other.

When the manipulator robot is actuated for a linear movement, lengths of the first link and the second link may be set to be the same as each other, and during the linear movement, the controller may be further configured to: control a first angle between the first link; and control a direction of linear movement to be maintained at ½ of a second angle between an extension line of the first link and the second link.

The pivoting force transmitting member may correspond to a gear combination including: a first gear located at a connection portion connecting the second link with one side of the first link and configured to rotate; a second gear located at the other side of the first link and configured to rotate; and a third gear disposed to transmit a rotational force of one of the first gear and the second gear as a rotational force to rotate the other, wherein, when the manipulator robot is actuated for a linear movement, lengths of the first link and the second link may be set to be the same as each other, and wherein, during the linear movement, the controller may be further configured to: control a first angle between the first link; and control a direction of linear movement to be maintained at ½ of a second angle between an extension line of the first link and the second link.

Effects obtainable from the present disclosure are not limited to the effects mentioned above, and other effects not mentioned will be clearly understood by those skilled in the art to which the present disclosure belongs from a description below.

DETAILED DESCRIPTION

Figure 1:
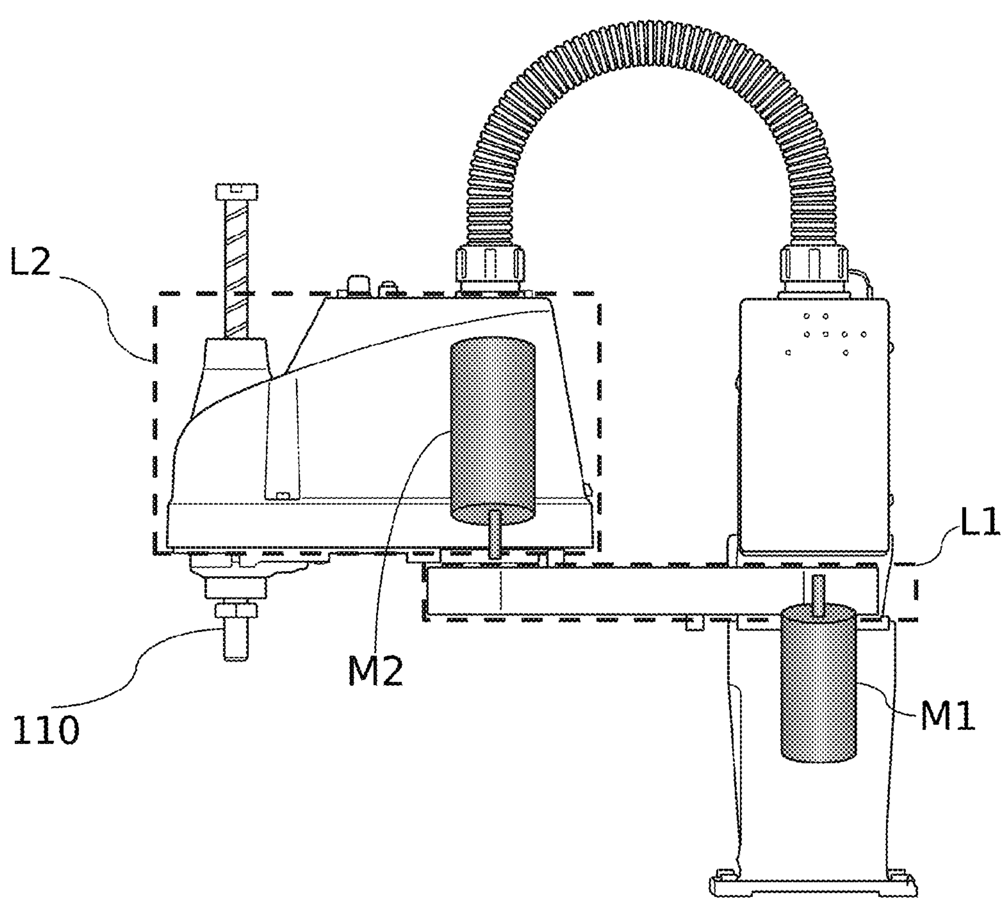
FIG. 1 is a diagram for illustrating an existing 2-degree-of-freedom manipulator robot.

Hereinafter, with reference to the attached drawings, embodiments of the present disclosure will be described in detail such that those skilled in the art may easily practice the same. However, the present disclosure may be implemented in several different forms and may not be limited to the embodiments described herein. To clearly illustrate the present disclosure in the drawings, parts unrelated to the description were omitted, and similar reference numerals were assigned to similar components throughout the present document.

Throughout the present document, when one component "includes" another component, this means that said one component may further include other components rather than excluding the same, unless otherwise specified.

Figure 2:
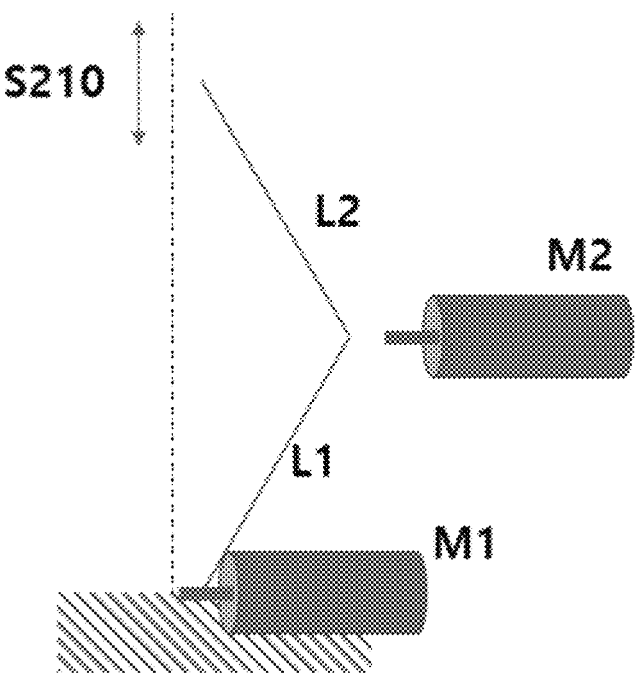
FIG. 2 is a diagram conceptualizing the 2-degree-of-freedom manipulator robot introduced in FIG. 1.

FIG. 2 is a diagram conceptualizing the 2-degree-of-freedom manipulator robot introduced in FIG. 1.

Even when the manipulator robot in FIG. 2 realizes a linear movement as indicated in step S210, driving of two motors M1 and M2 is required. For example, the first motor M1 may drive a first link L1 to pivot clockwise and the second motor M2 may drive a second link L2 to pivot counterclockwise to realize the above-described linear movement (S210).

However, it may be seen as over-spec in that the two motors are required to realize the above-mentioned linear movement (S210), and it may be complicated to control a driving combination of the first motor M1 and the second motor M2.

Figure 3:
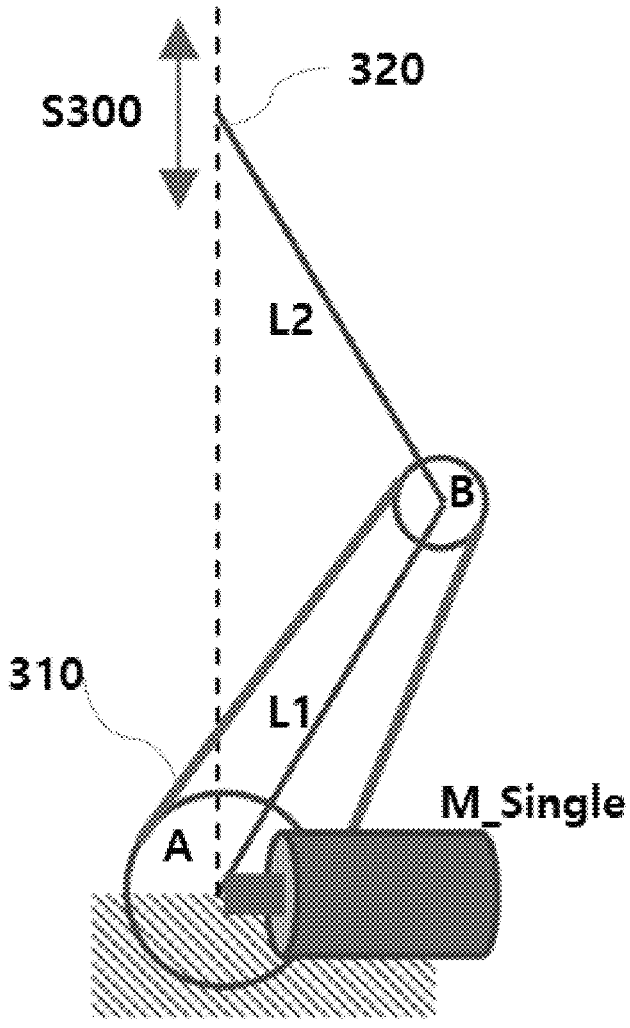
FIG. 3 is a diagram for illustrating a structure of a manipulator robot proposed according to an embodiment of the present disclosure.

FIG. 3 is a diagram for illustrating a structure of a manipulator robot proposed according to an embodiment of the present disclosure.

The manipulator robot shown in FIG. 3 includes the second link L2 equipped with an end effector 320 at one side (e.g., a second end); the first link L1 pivotably connected to the other side B (e.g., a first end) of the second link L2; a single motor M_Single that provides a pivoting force for pivoting the first link L1 and the second link L2; and a pivoting force transmitting member 310 that transmits a pivoting force of one of the first link L1 and the second link L2 to pivot the other of those by the single motor M_Single.

In the example shown in FIG. 3, the above-described pivoting force transmitting member 310 is formed as a belt 310. However, such pivoting force transmitting member does not need to be limited to the belt 310 illustrated in FIG. 3, and various schemes such as a gear combination (not shown) via connection of gears may be utilized.

In the example in FIG. 3, the belt 310 may be constructed to connect a second connection portion B for connecting the second link L2 with one side of the first link L1 with a first connection portion A for connecting the other side of the first link L1.

Such first connection portion A and second connection portion B may be formed in shapes of a first pulley and a second pulley, respectively, but may not necessarily be formed in the pulley shapes as long as they are able to transmit the pivoting forces of the links L1 and L2.

In the embodiment shown in FIG. 3, an example in which the single motor M_Single is located at the first connection portion A and transmits the pivoting force to the second connection portion B via the belt 310 is shown. However, the single motor M_Single may be located at the second connection portion B, so that the pivoting force of the second connection portion B is transmitted to the first connection portion A via the belt 310. That is, the single motor M_Single may be disposed at one of the first connection portion A and the second connection portion B based on a field situation and/or an arrangement relationship of the manipulator robot.

Using the structure described above, the manipulator robot proposed in FIG. 3 may realize a 1-degree-of-freedom movement, for example, a linear movement (S300) as shown in FIG. 3 via a more simplified configuration. This will be described in more detail below.

Figure 4:
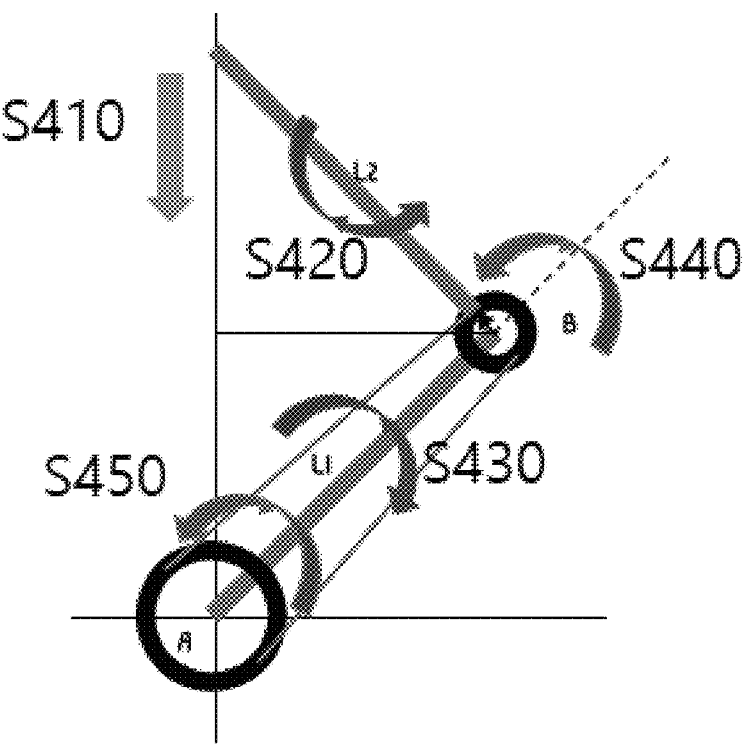
FIG. 4 is a diagram for illustrating an operation of realizing a linear movement using the manipulator robot described above in FIG. 3.

FIG. 4 is a diagram for illustrating an operation of realizing a linear movement using the manipulator robot described above in FIG. 3.

FIG. 4 shows an operation of the manipulator robot shown in FIG. 3 to perform a linear movement (S410). For convenience of description, it is assumed that the first and second connection portions are formed as the first and second pulleys.

For the linear movement (S410), the second link L2 may be required to pivot counterclockwise (S420) and the first link L1 may be required to pivot clockwise (S430).

In this situation, to provide a driving force to pivot the second link L2 counterclockwise (S420), the second pulley B may also be required to rotate counterclockwise (S440), which may be achieved by rotating (S450) the first pulley A connected to the second pulley B via the belt 310 counterclockwise using the single motor M_Single.

The above-described operating mechanism may be summarized as Table 1 below.

TABLE 1

| | Reference coordinate system | |
|---|---|---|
| | Ground (global) | L1 |
| S420 | +2ω | +2ω |
| S430 | −ω | 0 |
| S440 | +2ω | +2ω |
| S450 | 0 | +ω |

CCW: +,
CW: −,
speed: ω

Specifically, [Table 1] above represents a column indicating a direction and a degree of rotation/pivoting of each operation in FIG. 4 based on global coordinates, which is based on the ground, and a column indicating the direction and the degree of rotation/pivoting based on the first link L1.

Figure 5:
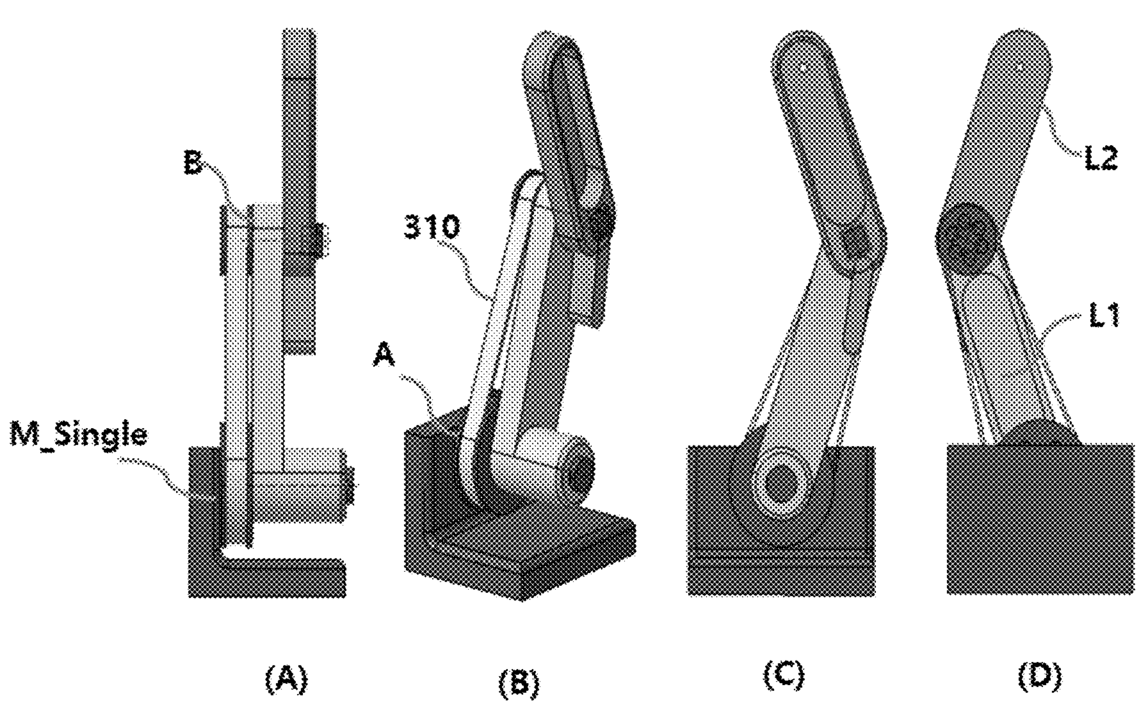
FIG. 5 is a diagram illustrating a manipulator robot from various viewpoints according to an embodiment of the present disclosure.

FIG. 5 is a diagram illustrating a manipulator robot from various viewpoints according to an embodiment of the present disclosure.

Specifically, (A) in FIG. 5 shows a structure viewed from the side of the manipulator robot according to one embodiment of the present disclosure, (B) in FIG. 5 shows a structure viewed from a 45-degree angle from the front, (C) in FIG. 5 shows a structure viewed from the front, and (b) in FIG. 5 shows a structure viewed from the rear.

According to the present embodiment utilizing the belt 310, as shown in (A) and (B) in FIG. 5, the first connection portion A may be composed of a pulley connected to the belt 310 and a cylindrical member for fixing the first link L1, and both may have different radii.

Radii of the connection portions A and B may be in connection with types of movements realized using the manipulator according to the present embodiment, which will be described in detail.

Figure 6:
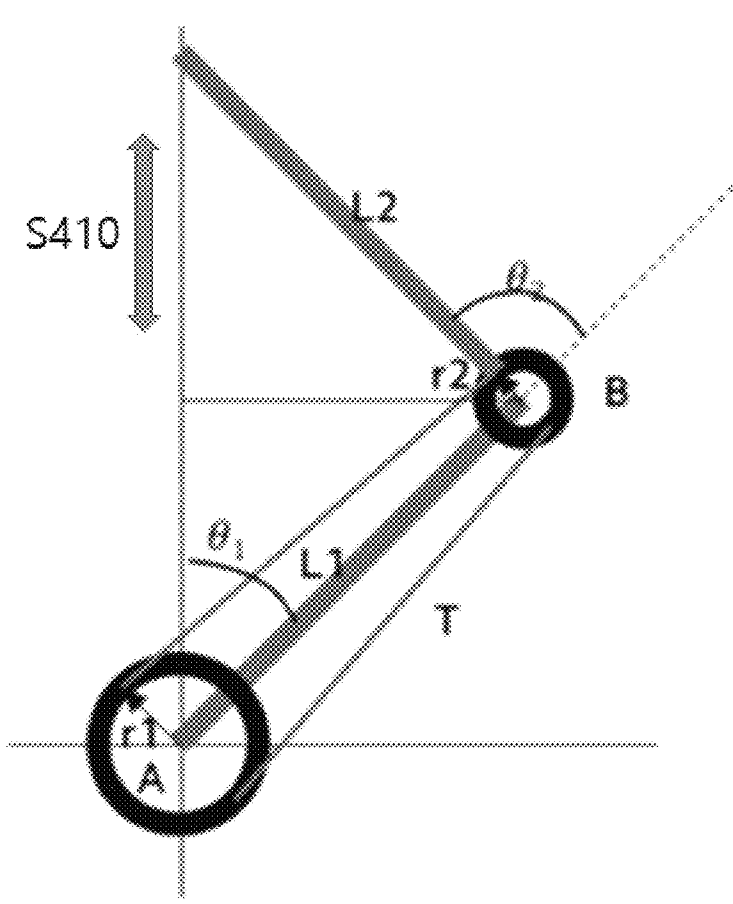
FIG. 6 is a diagram for illustrating conditions for realizing a linear movement using a manipulator robot according to an embodiment of the present disclosure.

FIG. 6 is a diagram for illustrating conditions for realizing a linear movement using a manipulator robot according to an embodiment of the present disclosure.

Variables for controlling a movement trajectory of the manipulator robot according to the present embodiment are simply defined as follows.

Length of first link: L1

Length of second link: L2

First angle between first link and linear movement direction: θ1

Second angle between extension line of first link and second link: θ2

Ratio between first angle and second angle: R=θ2/θ1

Under such variable definition, it is proposed to first satisfy following conditions to realize the linear movement described above in FIG. 4.

$$L1=L2$$

$$\theta 2=-2\theta 1$$

When the above-mentioned two conditions are satisfied, it may be seen that the linear movement (S410) is realized as shown in FIG. 6.

Among the two conditions mentioned above, $$\theta 2=-2\theta 1$$

the above is defined in terms of the angle between the links, but this may also be defined in terms of diameters r1 and r2 of the first connection portion A and the second connection portion B, and a total length T of the belt may be set accordingly.

Figure 7:
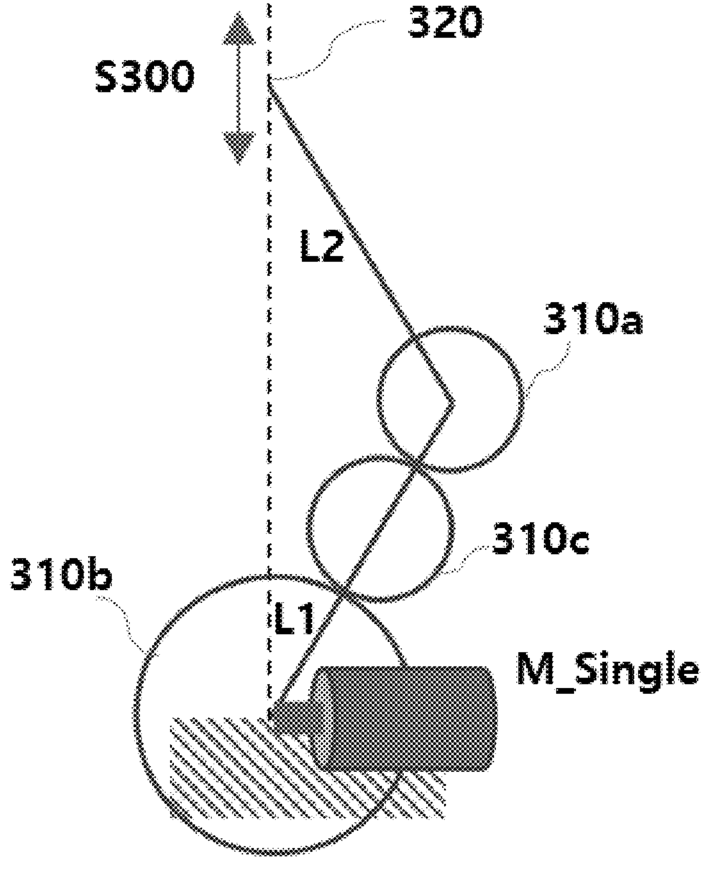
FIGS. 7 and 8 are diagrams for illustrating a structure of a manipulator robot proposed according to an embodiment of the present disclosure.
Figure 8:
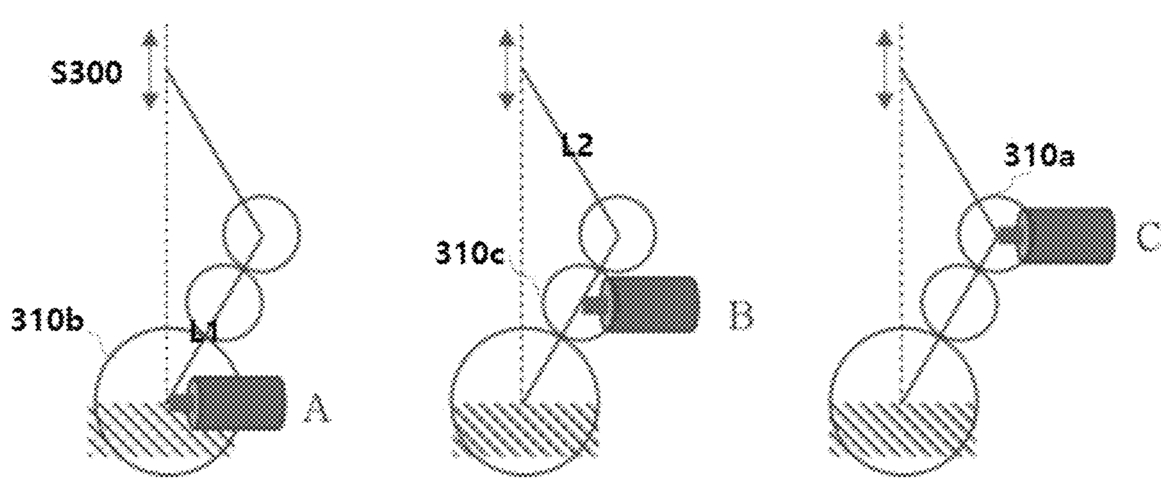

FIGS. 7 and 8 are diagrams for illustrating a structure of a manipulator robot proposed according to an embodiment of the present disclosure.

The manipulator robot shown in FIG. 7 includes the second link L2 equipped with the end effector 320 at one side; the first link L1 pivotably connected to the other side B of the second link L2; the single motor M_Single that provides the pivoting force for pivoting the first link L1 and the second link L2; and the pivoting force transmitting member 310 that transmits the pivoting force of one of the first link L1 and the second link L2 to pivot the other of those by the single motor M_Single.

In the example shown in FIGS. 7 and 8, a case in which the pivoting force transmitting member 310 described above is composed of a gear combination 310*a*, 310*b*, and 310*c* is illustrated. However, such pivoting force transmitting member does not need to be limited to the gear combination 310*a*, 310*b*, and 310*c* shown in FIGS. 3 and 4, and various schemes such as the belt (not shown) capable of transmitting the pivoting force may be utilized.

In the examples of FIGS. 7 and 8, the gear combination 310*a*, 310*b*, and 310*c* may include the first gear 310*a* that is located at the connection portion for connecting the second link L2 with one side of the first link L1 and rotates, the second gear 310*b* that is located at the other side of the first link L1 and rotates, and the third gear 310*c* that is disposed to transmit the pivoting force of one of the first gear 310*a* and the second gear 310*b* as the pivoting force of pivoting the other of those.

In the embodiment shown in FIG. 7, an example in which the single motor M_Single is located at a center of the second gear 310*b* and the pivoting force is transmitted to the first gear 310*a* via the third gear 310*c* is shown, but, as shown in FIG. 8, the single motor M_Single may be set to be disposed at a center of one of the first to third gears 310*a*, 310*b*, and 310*c* to provide a pivoting driving force. In other words, the location of the single motor M_Single may vary as shown in FIG. 8 based on the field situation and/or the arrangement relationship of the manipulator robot.

Using the structure described above, the manipulator robot proposed in FIGS. 7 and 8 may realize the 1-degree-of-freedom movement, for example, the linear movement (S300) as shown in FIG. 7 with a more simplified configuration. This will be described in more detail below.

Figure 9:
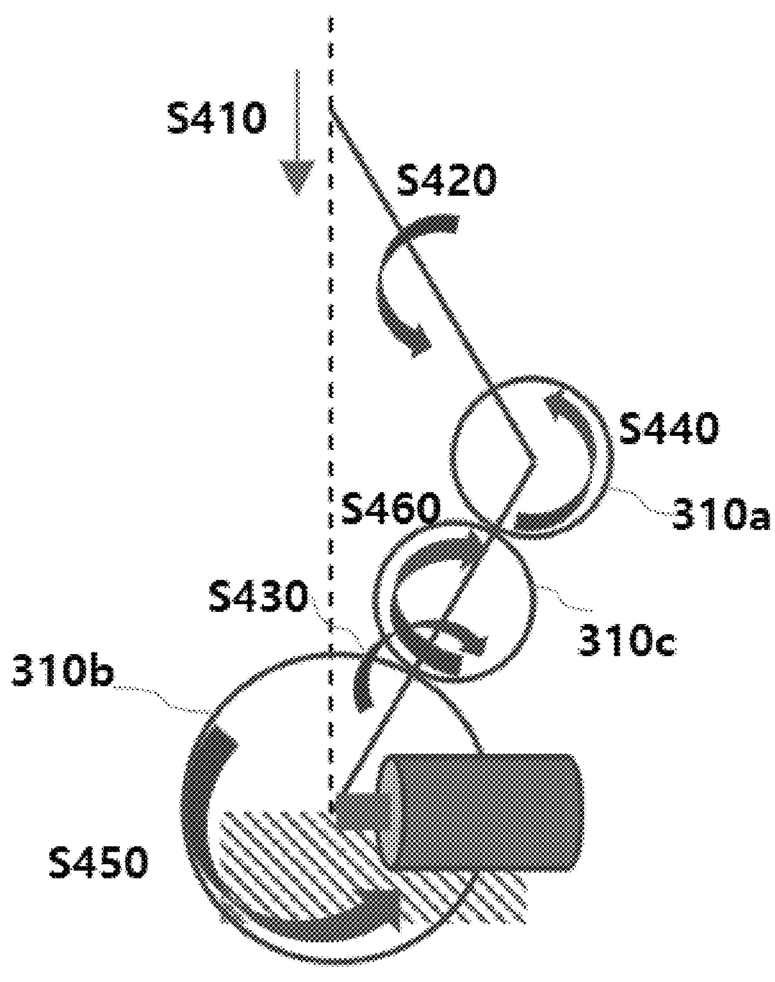
FIG. 9 is a diagram for illustrating an operation of realizing a linear movement using the manipulator robot described above in FIGS. 7 and 8.

FIG. 9 is a diagram for illustrating an operation of realizing a linear movement using the manipulator robot described above in FIGS. 7 and 8.

FIG. 9 shows an operation for the manipulator robot shown in FIGS. 7 and 8 to perform the linear movement (S410). For the linear movement (S410), the second link L2 may be required to pivot counterclockwise (S420) and the first link L1 may be required to pivot clockwise (S430).

In this situation, to provide a driving force to pivot the second link L2 counterclockwise (S420), the first gear 310*a* may also be required to rotate counterclockwise (S440), and it is required to rotate (S450) the second gear 310*b* counterclockwise to induce the clockwise pivoting (S430) of the first link L1.

That is, both the first gear 310*a* and the second gear 310*b* are required to rotate counterclockwise (S440 and S450), so that the third gear 310*c* not only transmits a rotating force of the second gear 310*b* by the single motor M_Single to the first gear 310*a*, but also induces the counterclockwise rotation (S440 and S450) of both the first gear 310*a* and the second gear 310*b* via the clockwise rotation (S460) of itself.

The above-described operating mechanism may be summarized as Table 2 below.

TABLE 2

| | Reference coordinate system | |
|---|---|---|
| | Ground (global) | L1 |
| S420 | +2ω ↺↺ | +2ω ↺↺ |
| S430 | −ω ↻ | 0 |
| S440 | +2ω ↺↺ | +2ω ↺↺ |
| S450 | 0 | +ω ↺ |

CCW: +,
CW: −,
speed: ω

Specifically, [Table 2] above represents a column indicating a direction and a degree of rotation/pivoting of each operation in FIG. 9 based on global coordinates, which is based on the ground, and a column indicating the direction and the degree of rotation/pivoting based on the first link L1. In Table 2 above, notation of S460 during the rotational movement in FIG. 9 is omitted. This is because it may be varied depending on a relationship between a radius of the third gear 310*c* and radii of the first and second gears 310*a* and 310*b*.

The rotation direction of the second gear 310*b* will be described in more detail based on [Table 2] above. For the linear movement (S410) shown in FIG. 9, as represented in [Table 2] above, the second gear 310*b* is required to rotate counterclockwise (+w) relative to the first link L1 to be stationary relative to the ground (based on the global coordinates). Therefore, the counterclockwise rotation direction as described above is required.

That is, both the first gear 310*a* and the second gear 310*b* are required to rotate in the same direction, and to realize the same via the gear combination, in another embodiment of the present disclosure, it is proposed that the gear combination includes an odd number of gears.

Figure 10:
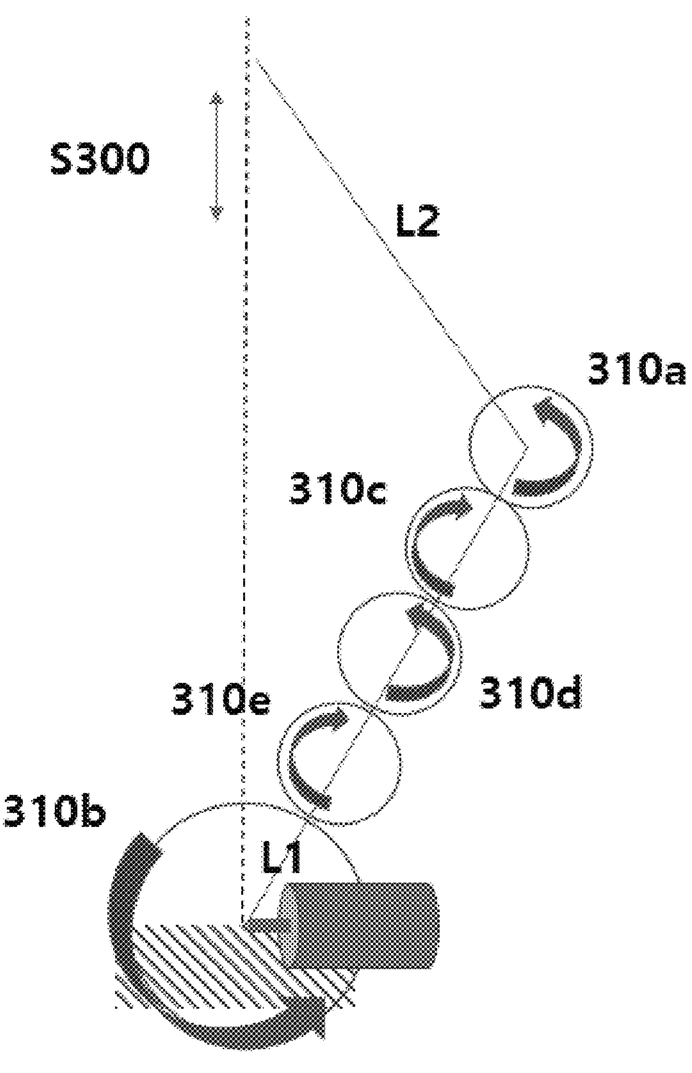
FIG. 10 is a diagram for illustrating a concept of adjusting the number of gears of a gear combination according to another embodiment of the present disclosure.

FIG. 10 is a diagram for illustrating a concept of adjusting the number of gears of a gear combination according to another embodiment of the present disclosure.

As described above, to support the linear movement (S300), the first gear 310*a* disposed at the connection portion of the two links and the second gear 310*b* disposed at the connection portion with the ground are required to rotate in the same rotation direction. To satisfy such requirement, the gear combination including the three gears is illustrated in FIGS. 7 to 9, but the present disclosure does not need to be limited thereto. As shown in FIG. 10, with a gear combination with five gears 310*a* to 310*e* or other gear combinations with an odd number of gears, the linear movement (S300) may be realized.

FIG. 10 shows an example in which the gear combination with the five gears 310*a* to 310*e* is disposed on a straight line with respect to the first link L1, but the present disclosure does not need to be limited thereto. An arrangement relationship of the third to fifth gears 310*c*, 310*d*, and 310*e* may be realized in various ways considering structural stability and space efficiency as long as the gears perform the above-described role of transmitting the rotational force and changing the rotation direction.

Figure 11:
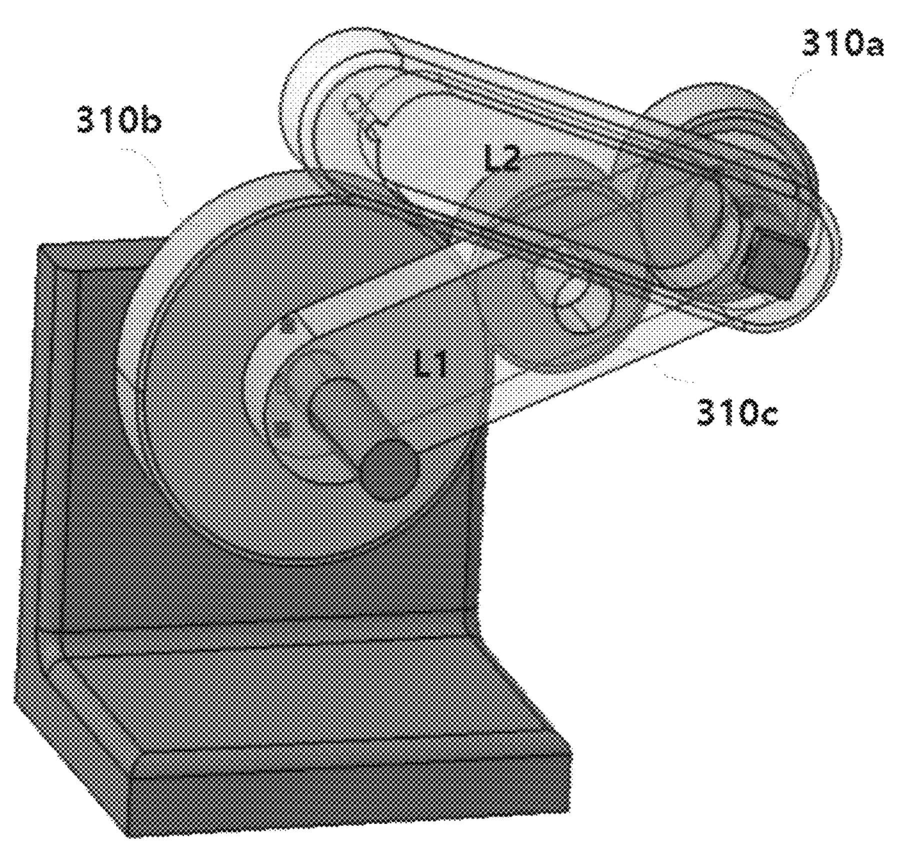
FIG. 11 is a diagram illustrating in detail a structure of the manipulator robot shown in FIG. 7.

FIG. 11 is a diagram illustrating in detail a structure of the manipulator robot shown in FIG. 7.

The manipulator robot as described above with reference to FIGS. 7 to 9 includes the gear combination of the three gears 310*a*, 310*b*, and 310*c*. FIG. 11 shows that the gear combination 310*a*, 310*b*, and 310*c* is disposed on the same plane (a first plane) to transmit the rotational force, and the first link L1 is disposed on a second plane in front of the first plane and the second link L2 is disposed on a third plane in front of the second plane.

In the structure described above, the first gear 310*a* may control a relative pivoting movement of the first link L1 and the second link L2, and the second gear 310*b* may control a relative pivoting movement of a support surface/a manipulator body and the first link L1.

Figure 12:
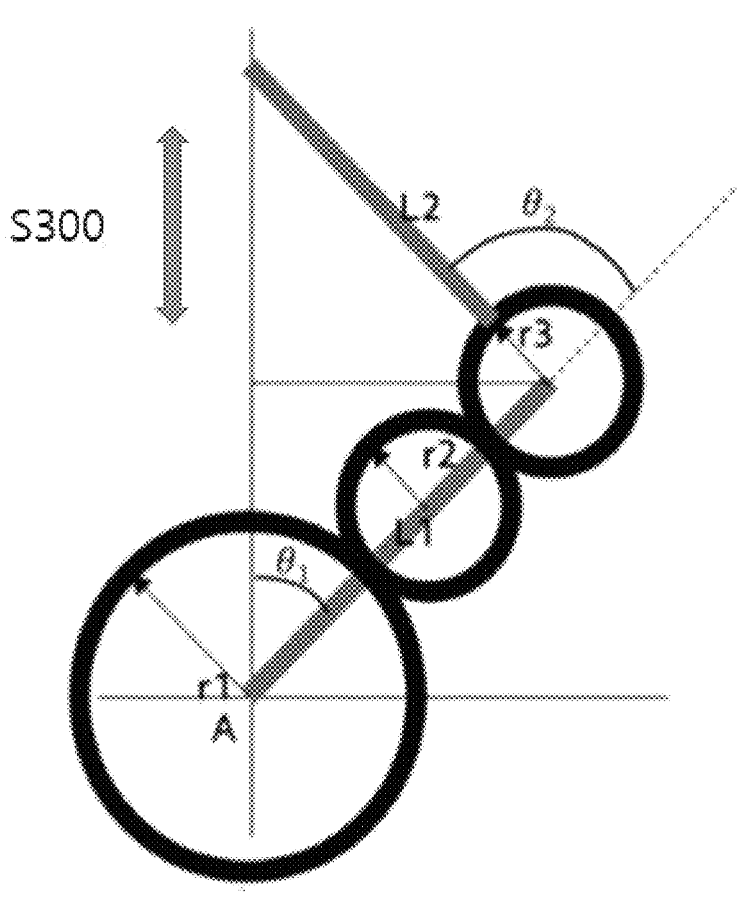
FIG. 12 is a diagram for illustrating conditions for realizing a linear movement using a manipulator robot according to an embodiment of the present disclosure.

FIG. 12 is a diagram for illustrating conditions for realizing a linear movement using a manipulator robot according to an embodiment of the present disclosure.

Variables for controlling the movement trajectory of the manipulator robot according to the present embodiment are simply defined as follows.

Length of first link: L1

Length of second link: L2

First angle between first link and linear movement direction: $\theta 1$

Second angle between extension line of first link and second link: $\theta 2$

Ratio between first angle and second angle: $R=\theta 2/\theta 1$

Radii of first to third gears: r1, r2, and r3

Under such variable definition, it is proposed to first satisfy following conditions to realize the linear movement (S300) described above.

$$L1=L2$$

$$\theta 2=-2\theta 1$$

Among the two conditions described above, the second condition may be defined as a ratio of radii as follows.

$$r1=2*r3$$

When the above-mentioned two conditions are satisfied, it may be seen that the linear movement (S410) is realized as shown in FIG. 8.

Figure 13:
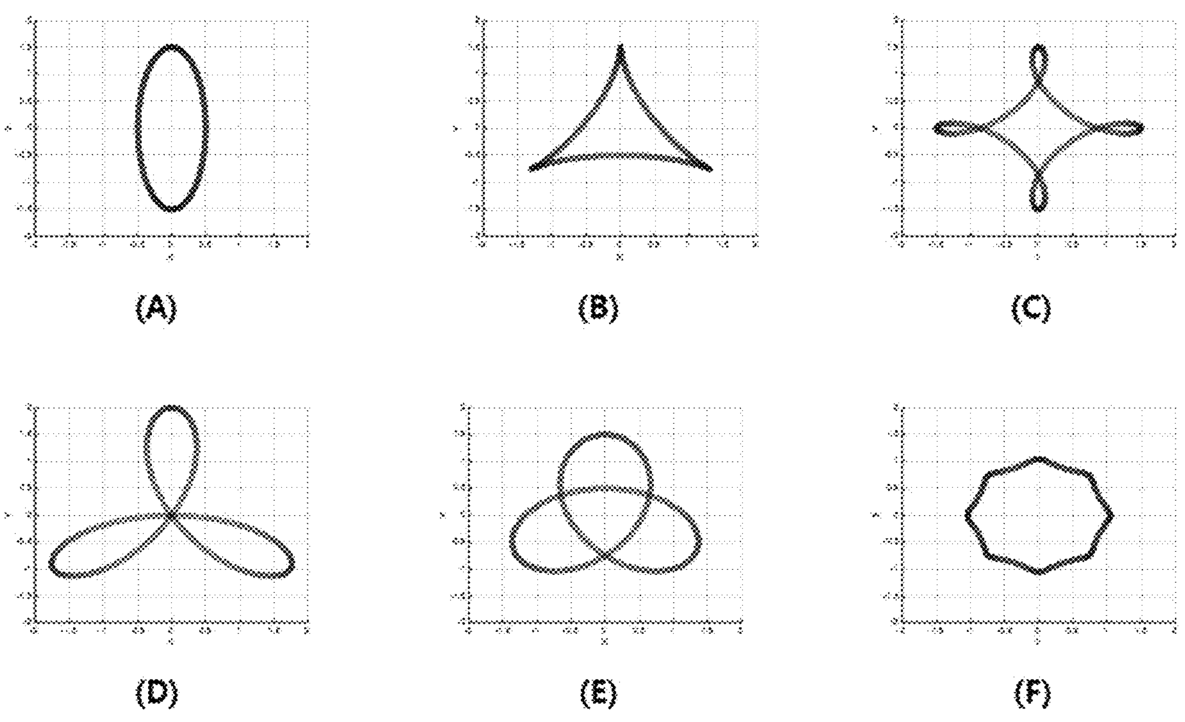
FIG. 13 is a diagram illustrating various movement trajectories using a manipulator robot according to another embodiment of the present disclosure.

FIG. 13 is a diagram illustrating various movement trajectories using a manipulator robot according to another embodiment of the present disclosure.

Specifically, the various movement trajectory examples in FIG. 13 assume that the variable definition described above in relation to FIG. 6 is used as it is.

(A) in FIG. 13 shows a movement trajectory realized with L1=1.0, L2=0.5, and R=2.0, and (B) in FIG. 13 shows a movement trajectory realized with L1=1.0, L2=0.5, and R=3.0.

(C) in FIG. 13 shows a movement trajectory realized with L1=1.0, L2=0.5, and R=4.0, and (D) in FIG. 13 shows a movement trajectory realized with L1=1.0, L2=1.0, and R=3.0, (E) in FIG. 13 a movement trajectory realized with L1=0.5, L2=1.0, and R=3.0, and (F) in FIG. 13 represents a movement trajectory realized with L1=1.0, L2=0.05, and R=8.0.

In other words, the manipulator robot according to the present disclosure as described above may realize the various movement trajectories even when the single motor is used. In common, when using the above-mentioned manipulator robot to realize a curvilinear movement, it may be seen that conditions below are satisfied.

$$L1 \neq L2$$

Figure 14:
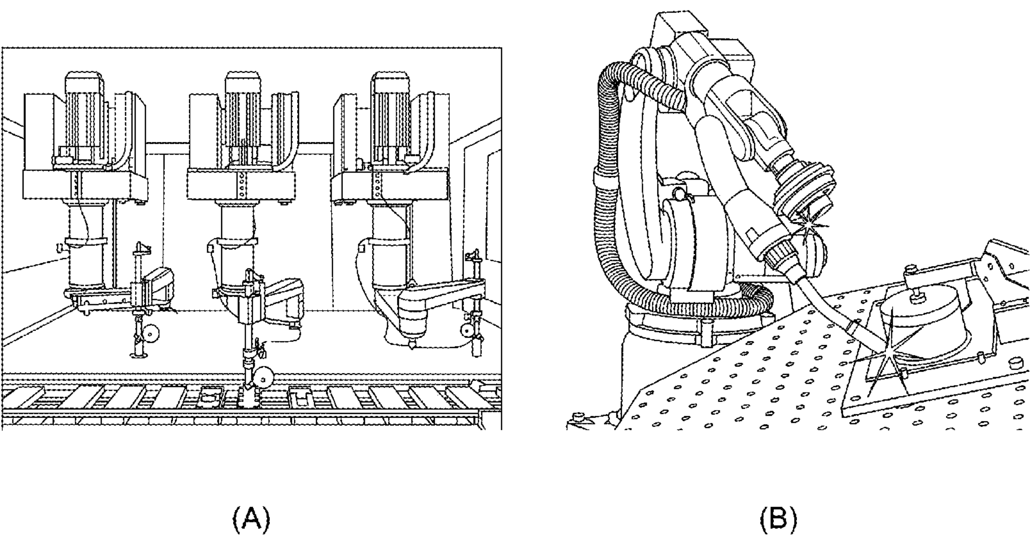
FIG. 14 is a diagram illustrating fields in which a manipulator robot may be utilized according to embodiments of the present disclosure.

FIG. 14 is a diagram illustrating fields in which a manipulator robot may be utilized according to embodiments of the present disclosure.

Specifically, as shown in (A) in FIG. 14, an end effector that performs the pick and place operation may be disposed and optimally used in a factory conveyor belt. A trajectory of such pick and place operation may be set to various trajectories in addition to a straight trajectory as described above with reference to FIGS. 6 and 7.

Additionally, as shown in (B) in FIG. 14, it may also be used for the fusion and cutting operation. As described above, it may also be used in a place where non-linear curve is required in the fusion and cutting operation.

In an exemplary embodiment, a controller (i.e., one or more processors) may be configured to control the single motor M_Single to pivot at least one of the first link L1, the second link L2, or a combination thereof, and the pivoting force transmitting member 310 to transmit the pivoting force of one of the first link L1 and the second link L2 provided by the single motor M_Single to pivot the other.

The detailed description of the preferred embodiments of the present disclosure disclosed as described above is provided to enable those skilled in the art to implement and practice the present disclosure. Although the description has been made with reference to the preferred embodiments of the present disclosure, those skilled in the art will understand that the present disclosure may be modified and changed in various ways without departing from the scope of the present disclosure. For example, a person skilled in the art may use each of the components described in the above-described embodiments in a manner of combining the components with each other.

Accordingly, the present disclosure is not intended to be limited to the embodiments described herein, but is to be accorded the widest scope consistent with the principles and novel features disclosed herein.

INDUSTRIAL APPLICABILITY

Despite the simplified configuration thereof, the manipulator robot according to the embodiments of the present disclosure as described above may be utilized in a variety of ways in overall application area of the existing 2-degree-of-freedom manipulator robot by replacing the same.

What is claimed is:

1. A manipulator robot comprising:
- a first link including a first end and a second end;
- a second link including:
  - a first end and a second end; and
  - an end effector at the second end thereof, the first end of the second link pivotably connected to the second end of the first link;
- a single motor connectable to the first end of the first link or the second end of the first link, and configured to provide a pivoting force for pivoting the first link and the second link; and
- a pivoting force transmitting member actuated by the single motor and configured to:
  - transmit a pivoting force of the first link to pivot the second link; and
  - transmit a pivoting force of the second link to pivot the first link.

2. The manipulator robot of claim 1, wherein the pivoting force transmitting member includes a belt connecting a second connection portion connecting the second link with second end of the first link and a first connection portion connecting the first end of the first link.

3. The manipulator robot of claim 2, wherein the first connection portion and the second connection portion respectively comprise a first pulley and a second pulley.

4. The manipulator robot of claim 2, wherein the single motor is disposed at one of the first connection portion and the second connection portion.

5. The manipulator robot of claim 1, wherein, when the manipulator robot is actuated for a linear movement of the first link and the second link, lengths of the first link and the second link are set to be the same as each other.

6. The manipulator robot of claim 5, wherein, during the linear movement, a first angle between the first link and a direction of linear movement is controlled to be maintained at ½ of a second angle between an extension line of the first link and the second link.

7. The manipulator robot of claim 1, wherein, when the manipulator robot is actuated for a curvilinear movement, lengths of the first link and the second link are set to be different from each other.

8. The manipulator robot of claim 1, wherein the pivoting force transmitting member corresponds to a gear combination including:
- a first gear located at a connection portion connecting the second link with the second end of the first link and configured to rotate;
- a second gear located at the second end of the first link and configured to rotate; and
- a third gear disposed to transmit a rotational force of one of the first gear and the second gear as a rotational force to rotate the other.

9. The manipulator robot of claim 8, wherein the gear combination is composed of an odd number of gears, including the first to third gears.

10. The manipulator robot of claim 9, wherein the single motor is disposed at a center of one of the first to third gears.

11. The manipulator robot of claim 8, wherein, when the manipulator robot is actuated for a linear movement, lengths of the first link and the second link are set to be the same as each other.

12. The manipulator robot of claim 11, wherein, during the linear movement, a first angle between the first link and a direction of linear movement is controlled to be maintained at ½ of a second angle between an extension line of the first link and the second link.

13. The manipulator robot of claim 8, wherein, when the manipulator robot is actuated for a curvilinear movement, lengths of the first link and the second link are set to be different from each other.

14. The manipulator robot of claim 1, wherein the end effector performs a function of a robot arm.

15. A manipulator robot comprising:

a first link including a first end and a second end;

a second link including:

a first end and a second end; and an end effector at the second end thereof, the first end of the second link pivotably connected to the second end of the first link;

a single motor connectable to the first end of the first link or the second end of the first link, and configured to provide a pivoting force;

a pivoting force transmitting member actuated by the single motor and configured to provide a pivoting force; and a controller configured to control the single motor and the pivoting force transmitting member to:

transmit a pivoting force of the first link to pivot the second link; and transmit a pivoting force of the second link to pivot the first link.

16. The manipulator robot of claim 15, wherein, when the manipulator robot is actuated for a linear movement, lengths of the first link and the second link are set to be the same as each other, and wherein, during the linear movement, the controller is further configured to:

control a first angle between the first link; and control a direction of linear movement to be maintained at ½ of a second angle between an extension line of the first link and the second link.

17. The manipulator robot of claim 15, wherein the pivoting force transmitting member corresponds to a gear combination including:

a first gear located at a connection portion connecting the second link with second end of the first link and configured to rotate;

a second gear located at the first end of the first link and configured to rotate; and a third gear disposed to transmit a rotational force of one of the first gear and the second gear as a rotational force to rotate the other, wherein, when the manipulator robot is actuated for a linear movement, lengths of the first link and the second link are set to be the same as each other, and wherein, during the linear movement, the controller is further configured to:

control a first angle between the first link; and control a direction of linear movement to be maintained at ½ of a second angle between an extension line of the first link and the second link.

* * * * *